INVENTOR
Ross C. Winterbottom
BY
Noel B. Hammond
AGENT.

VOICE OPERATED COMMUNICATION SYSTEM

INVENTOR.
ROSS C. WINTERBOTTOM
BY
Noel B. Hammond
AGENT.

INVENTOR.
ROSS C. WINTERBOTTOM
BY
Noel B. Hammond
AGENT.

United States Patent Office 3,397,401

Patented Aug. 13, 1968

3,397,401

VOICE OPERATED COMMUNICATION SYSTEM

Ross C. Winterbottom, Santa Monica, Calif., assignor to Hughes Aircraft Company, Culver City, Calif., a corporation of Delaware Filed May 27, 1966, Ser. No. 553,517
4 Claims. (Cl. 343—177)

ABSTRACT OF THE DISCLOSURE

In a voice-operated transmitter, application of the modulating signal is delayed until after transmission of the carrier has begun, and the carrier continues until after the termination of the modulating signal. A detector produces control signals in response to the modulating signal and applies them to switch means provided to prevent operation of the transmitter. In another embodiment, control signals are modulated onto the carrier prior to and after modulation of the carrier by the modulating signal. In the receiver, a squelch gate is opened before the audio signal reaches the gate and closed after the audio signal has passed through.

Figure 1:
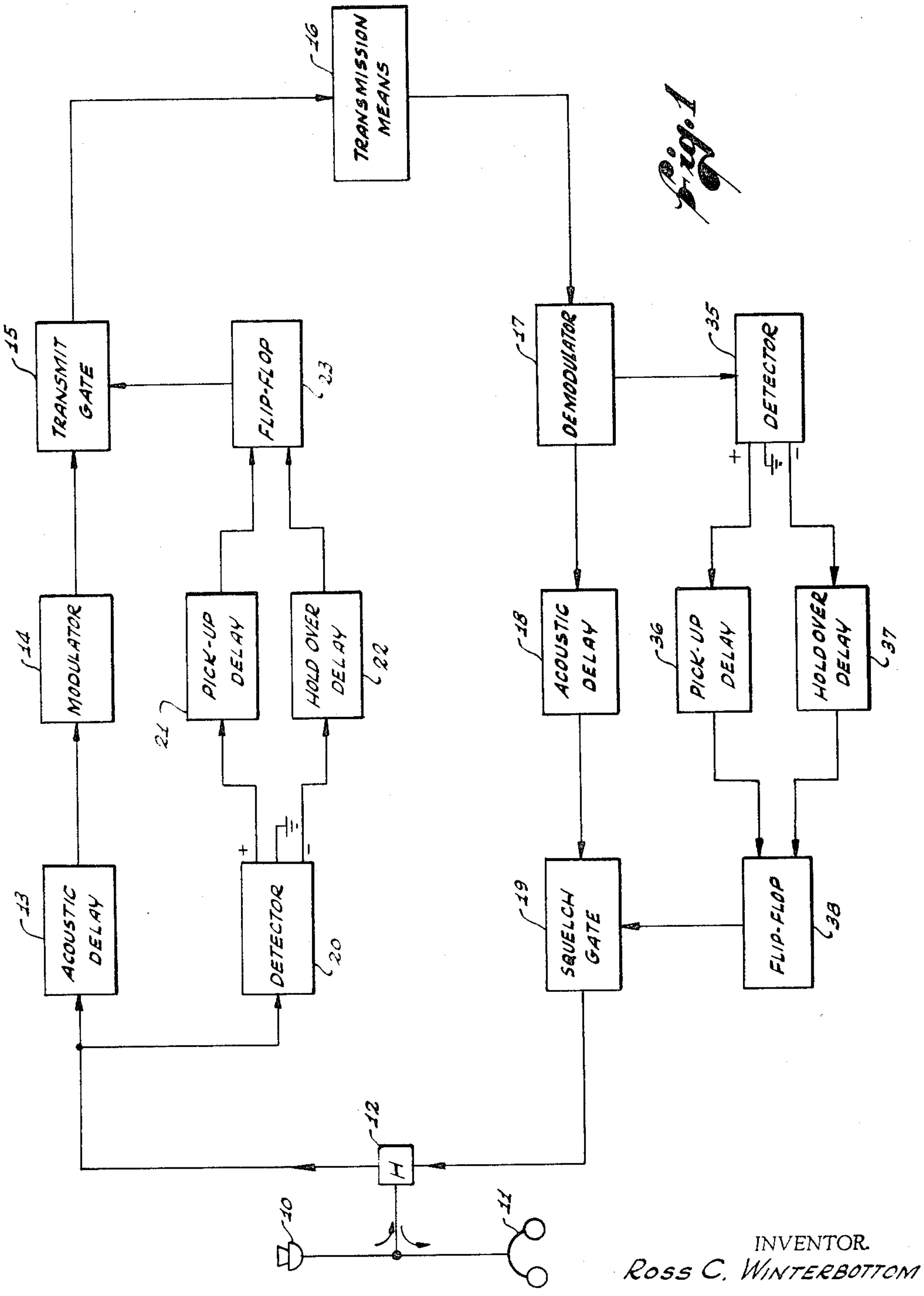

This invention relates to communication systems and more particularly to improvements in audio-controlled transmission systems for preventing clipping of the initial portion of the signals in transmission and for eliminating noise bursts or "spitting" in receivers during pauses and at the ends of audio signals.

It is common to use a voice signal to operate a transmitter, wherein the initial portion of the signal is used to start the transmitter, which is then modulated by the voice signal. Unfortunately, a finite time is required to ascertain the existence of the voice signal and for the transmitter to be turned on in response to the voice signal. Accordingly, by the time the transmitter is operating, the first part of the actuating signal has disappeared.

Thus, the first part of the signal is not transmitted, i.e., it is clipped. At the receiver, therefore, the voice signal extracted from the carrier is heard lacking its initial syllable(s), e.g., only the portion of the signal following the first syllable(s) may be heard. This, of course, is an irritating circumstance to the listener.

It is also common in receivers that a disturbing noise burst is heard at the end of a transmission, i.e., when the voice signal terminates thereby causing transmission to cease. At this time, a short burst of noise passes through from the receiver to the listener. Such "spitting" is quite pronounced in frequency modulation systems, but is disquieting in most systems.

To minimize the effects of noise in a receiver at the end of a transmission, squelch means are normally employed. A normally open squelch gate is closed in response to a received signal and is closed upon cessation of the signal that occurs when the voice signal ends. However, a finite time is required for the termination of the signal to be detected. Accordingly, some noise gets through and is heard before the squelch circuit is closed.

Still further, the use of such a squelch circuit effects additional clipping of the first portion of the voice signal. Since the presence of a signal is required to close the squelch gate, and since time is required to detect the first portion of the incoming signal to close the gate, such first portion of the received signal is lost by the time the squelch gate is closed. Thus, the receiver further clips an already clipped voice signal.

The problems of clipping and "spitting" are accentuated in a voice-controlled communication system in which a transmitter is turned on and off many times each minute during a conversation. In such case, clipping occurs each time the transmitter is turned on. Correlatively, unwanted noise bursts occur at the corresponding receiver at the end of each such transmission.

It is an object of my invention to provide means for eliminating clipping of signals in a voice-operated communication system.

It is another object of my invention to provide means for eliminating clipping and/or noise bursts in a receiver at the ends of a voice controlled signal.

A further object of my invention is to provide a voice-operated transmission system wherein clipping and noise bursts at the beginning and end of voice signals are eliminated by simple and inexpensive means.

Figure 3:
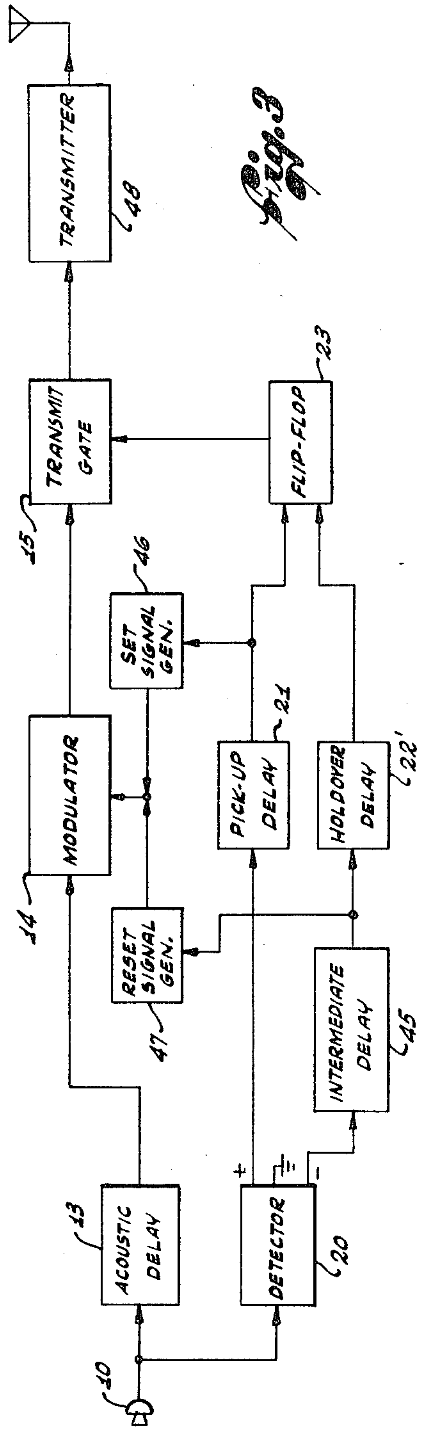
Figure 4:
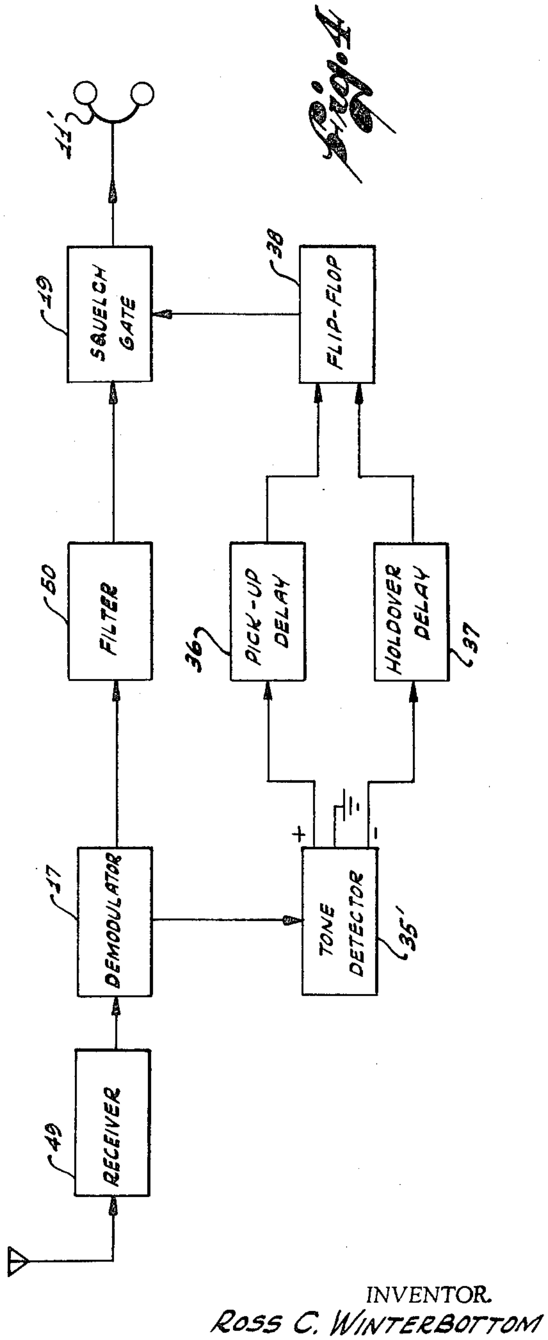

The above and other objects and advantages of my invention will become apparent from the following description taken in conjunciton with the accompanying drawings of illustrative embodiments thereof, in which:

FIGURE 1 is a block diagram of a transmit-receive unit of a voice-operated communication system having clipping and noise burst eliminating means in accordance with my invention;

FIGURES 2*a*–2*h* are graphs of voltage wave forms to aid in explaining the operation of the system of FIGURE 1;

FIGURE 3 is a block diagram of a transmitter system having modified means in accordance with my invention for effecting elimination of clipping and noise bursts at the beginnings and ends of voice signals; and FIGURE 4 is a block diagram of a receiver system for processing signals received from the transmission system of FIGURE 3.

Referring to FIGURE 1, a microphone 10 and earphones 11 are shown connected to a transmit-receiver device indicated as a hybrid 12. Signals from the microphone pass through the hybrid 12 to an acoustic delay means 13, which may be any simple conventional electrical or electro-mechanical network constituting a delay line. The acoustic delay 13 is connected to a modulator 14, the output of which is coupled through a transmit switch or gate 15 to transmission means 16.

Received signals are indicated as coming from the transmission means 16 into a demodulator 17, the output of which is coupled through an acoustic delay means 18 and a squelch switch or gate 19 to the hybrid 12. In this connection, the transmission means 16 may be any suitable instrumentation for transmitting signals to a distant point and through which transmission from a distant point are fed to the demodulator 17. Thus, the transmission means 16 may include transmit and receive antennas, as for a transmit-receive radio unit. The transmission means 16 may be comprised of long transmission lines or cables wherein signals from the modulator 14 are sent to a distant receiver, and through which signals from a distant transmitter are fed to the demodulator 17.

The acoustic delays 13, 18 are utilized in my invention to eliminate the undesired clipping and noise bursts previously mentioned. Referring to the transmitter portion of FIGURE 1, the voice signals applied to the acoustic delay 13 are also applied to a detector 20 which is adapted to provide positive and negative outputs through respective pick-up and holdover delays 21, 22, the outputs of which are coupled to a flip-flop 23 that is provided for controlling the transmit gate 15. In this latter connection, the flip-flop 23 has respective stable states in which it opens and closes the transmit gate 15.

Figures 2A, 2B, 2C, 2D, 2E, 2F, 2G, 2H:
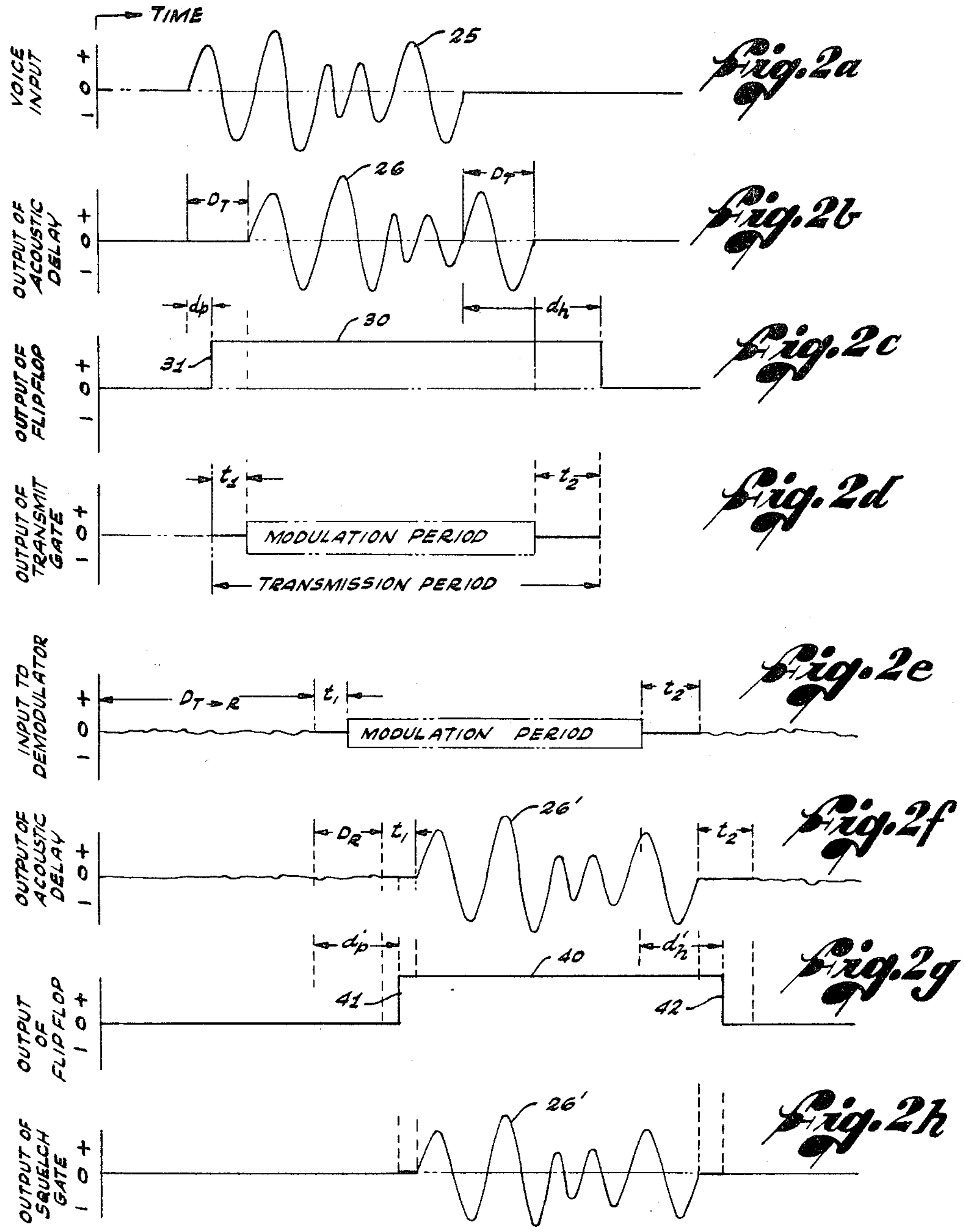

Referring to FIGURES 2*a*–2*d* in connection with FIGURE 1, FIGURE 2*a* illustrates the wave form 25 of an audio signal from the microphone 10 which is applied through the hybrid 12 to the inputs of the acoustic delay 13 and the detector 20. Transmission of the signal 25 through the acoustic delay 13 is delayed by a time, $D_T$, greater than the period of delay of the outputs of the detector 20 through the delays 21, 22.

Through the pick-up delay 21, the output of the detector 20 sets the flip-flop 23 in the state for closing the transmit gate 15 before the delayed signal 26 (FIGURE 2*b*) from the acoustic delay 13 is applied to the modulator 14. The pick-up delay 21 may be constituted only of the inherent delays in the detector network for developing the set signal for the flip-flop 23, or it may be comprised of a specific delay device as desired.

Through the holdover delay 22, the flip-flop 23 is set to its other stable state to open the transmit gate 15. This event occurs a predetermined period, dictated by the delay in the holdover delay 22, following the end of the signal 25 from the microphone 10. In this connection, it will be noted that the signal from the detector 20 through the holdover delay 22 is of opposite polarity to that through the pick-up delay 21. Thus, during the period when the transmitter is being modulated by the voice signal, the voltage out of the holdover delay 22 is below that necessary to change the flip-flop to its other stable state. Furthermore, for a period of time following the end of the modulation, as determined by the delay in the holdover delay 22, the output from such holdover delay precludes switching the flip-flop to its other stable state. During such delay, the transmit gate 15 is kept closed, i.e., the transmitter is kept on. At the end of such delay, the voltage from the holdover delay rises to a level sufficient to change the flip-flop 23 to its other stable state, thereby opening the transmit gate 15 and preventing further transmission.

For further clarification of the foregoing, reference will be made to FIGURES 2*c* and 2*d*. FIGURE 2*c* illustrates the DC output 30 from the flip-flop 23, which it utilized to close the transmit gate 15. As indicated at 31 in FIGURE 2*c*, the DC voltage 30 is established at a time, $d_p$, less than the delay $D_T$, of the voice signal. Thus, the transmit gate 15 is closed for a period of time $t_1$ before the delayed voice signal 26 appears at the input of the modulator 14. Accordingly, the transmit gate is closed so that the modulation period of the transmitter (see FIG. 2*d*) is preceded by a silent period of transmission.

The transmission period continues past the modulation period for a time $t_2$ dictated by the delay $d_h$ in the holdover delay 22, i.e., until the voltage in the output of the holdover delay rises to a level sufficient to change the flip-flop 23 to its other stable state to open the transmit gate 15 and prevent further transmission. As will now be explained, this continued transmission for a predetermined period following the modulation period is utilized to prevent undesired noise bursts in the output of the receiver.

Referring to FIGURE 1, the demodulated output from the demodulator 17 is applied to a detector 35. The detector 35, like the detector 20 in the transmitter portion of the system, is adapted to provide voltages of opposite polarity through respective connections to a pick-up delay 36 and a holdover delay 37. As shown, the pick-up and holdover delays 36, 37 are connected to a flip-flop 38 which is provided for opening and closing the squelch gate 19.

For simplicity, it will be assumed that the signal 26 in FIGURE 2*b* has been transmitted via a transmitter system as above described, but from a remote transmitter station. Referring to FIGURE 2*e*, there is, of course, a delay $D_{T\rightarrow R}$ for the signal to get from the transmitter to the demodulator 17. Such signal, of course, includes the period $t_1$, the modulation period, and the period $t_2$ during which the transmitter was on, all as above described. FIGURE 2*f* illustrates the received signal 26' out of the demodulator 17, following a delay in the acoustic delay 18, such delay being indicated as $D_R$. Thus, as a result of the modulation scheme above described, the signal 26' includes the voice signal preceded by a silence period $t_1$ during which the carrier is unmodulated, and followed by a silence period $t_2$ during which the carrier is unmodulated.

FIGURE 2*g* illustrates a DC voltage 40 out of the flip-flop 38 for closing the squelch gate 19. Due to the delay $d'_p$ in the pick-up delay 36, the time at which the voltage 40 is established, as indicated at 41, occurs during the period $t_1$ (FIG. 2*f*). Accordingly, the flip-flop 38 is set to the state in which it closes the squelch gate 19 at a time during the period $t_1$ and hence, prior to the first portion of the voice signal 26' from the acoustic delay 18 reaching the squelch gate 19. Therefore, the squelch gate 19 is closed to permit the entire voice signal to pass unclipped to the earphones 11.

Like the pick-up delay 21, the holdover delay 37 provides a short delay, and may be constituted only of inherent delay in the detector circuit. The holdover delay 37 is set to permit the application of a voltage to the flip-flop 38 for setting it to its other stable state, and thereby opening the squelch gate 19, prior to the end of the period $t_2$, as indicated at 42. Therefore, and as best seen in FIGURE 2*h*, the signal out of the squelch gate 19 is the entire voice signal 26', preceded and followed by short intervals of silence. By thus opening the squelch gate 19 during such a period of silence, I effectively eliminate the opportunity for any unwanted noise to pass through the squelch gate before it is opened.

Referring again to FIGURE 2*c*, the holdover delay $d_h$ at the transmitter is preferably determined to keep the transmitter on during extremely short pauses between syllables. As will be appreciated, many multi-syllable words are pronounced with short pauses between certain syllables. Accordingly, it is not desired to turn the transmitter off during such short intervals. Therefore, the holdover delay 22 preferably is designed to insure that at the end of any given syllable or word, the transmitter is kept on for a sufficient period, e.g., 0.1 sec., to avoid turning the transmitter off and then back on during such intervals in voice signals.

FIGURES 3 and 4 illustrate a voice operated communication system in which means are provided for transmitting control signals which are utilized in the receiver for eliminating undesired clipping and noise burst. Referring to FIGURE 3, the pick-up delay 21, as in the previously described system, provides a substantially shorter delay than does the acoustic delay 13. An additional, intermediate delay 45 is connected between the detector 20 and the holdover delay 22'. Additionally, a set signal generator 46 and a reset signal generator 47 are coupled to the modulator 14, the generator 46 being connected between the pick-up delay 21 and the flip-flop 23, and the generator 47 being connected between the intermediate delay 45 and the holdover delay 22'.

With the above described arrangement, the set signal generator 46 is adapted to modulate the carrier with a set signal immediately ahead of the arrival of the voice signal from the acoustic delay 13. With reference to FIGURE 2*c*, the transmit gate 15 is closed so that the transmitter is turned on and such signal is modulated on the carrier during the period $t_1$ prior to the beginning of the modulation period for the voice signal.

The intermediate delay 45 is adapted to cause the reset signal generator to modulate the carrier with a reset signal during the interval following the modulation by the voice signal, i.e., during the period $t_2$ (FIG. 2*d*) following the modulation period while the transmitter is still on. For this purpose, it will be appreciated that the combination of the delays of the intermediate delay 45 and the holdover delay 22' in this case is substantially the same as the delay provided by the holdover delay 22 of FIGURE 1. Thus, the intermediate delay 45 provides a delay somewhat greater than the difference between the delays $d_h$ and $t_2$ (FIGS. 2*c*, 2*d*), and the holdover delay 22' of FIGURE 3 provides the remaining delay needed to make up such difference. Accordingly, the transmitter 48 connected to the transmit gate 15 effects the radiation of a signal during the same transmission period as illustrated in FIGURE 2*d* for the system of FIGURE 1, but wherein respective set and reset signals are modulated on the carrier during the periods $t_1$ and $t_2$.

Referring to FIGURE 4, the receive signals entering the receiver 49 are applied to the demodulator 17, and thence through a filter 50 to the squelch gate 19. It will be noted that the filter 50 replaces the acoustic delay 18 of FIGURE 1. Thus, the receive signal is not subjected to delay in passing through the squelch 19. In this latter connection, the filter 50 is adapted to pass only the voice signal.

However, the squelch gate 19 is closed via the flip-flop 38 in response to the set signal that is present in the period $t_1$ preceding the voice signal. Following the voice signal, the state of the flip-flop 38 is changed (to open the squelch gate) in response to the reset signal through the holdover delay 37.

From the foregoing, it will be apparent that, in addition to the combinations shown and described, my invention embraces the use of my clip-eliminating means for any transmission system, i.e., wherein it is decided that the receiver system can tolerate the noise burst at the end of a voice signal, i.e., wherein it is desired only to make certain that none of the initial portion of a voice signal is clipped. Additionally, my invention obviously embraces various modifications and combinations of the embodiments illustrated herein. Accordingly, I do not intend that my invention be limited, except in accordance with a reasonable interpretation of the appended claims.

I claim:

1. In combination with a carrier transmitter and a modulator therefor:

switch means connected to said modulator to enable or disable operation of said transmitter;

a flip flop having an output terminal connected to said switch means for controlling the operation of said switch means;

first delay means to apply an audio signal to said modulator after a first predetermined time period;

a detector having said audio signal applied thereto, said detector having first and second output terminals, said first output terminal being coupled to said flip flop for controlling the enabling of said transmitter; and second delay means providing a time delay for a second predetermined time period coupling said second output terminal of said detector to said flip flop for controlling the disabling of said transmitter, whereby said switch means enables said transmitter a predetermined time period before said audio signal is applied thereto and disables said transmitter a predetermined time period after the termination of said audio signal.

2. In combination with a carrier transmitter and a modulator therefor:

switch means connected to said modulator to enable or disable operation of said transmitter;

a flip flop having an output terminal connected to said switch means for controlling the operation of said switch means;

first delay means to apply an audio signal to said modulator after a first predetermined time period;

a detector having said audio signal applied thereto, said detector having first and second output terminals, said first output terminal being coupled to said flip flop for controlling the enabling of said transmitter;

second and third serially-connected delay means providing a time delay for a second predetermined time period coupling said second output terminal of said detector to said flip flop controlling the disabling of said transmitter, whereby said switch means enables said transmitter a predetermined time period before said audio signal is applied thereto and disables said transmitter a predetermined time period after the termination of said audio signal;

a first signal generator having an output terminal connected to said modulator and having a control terminal coupled to said first output terminal of said detector for modulating a first control signal on the carrier preceding said audio signal;

a second signal generator having an output terminal connected to said modulator and having a control terminal coupled to the junction between said second and third delay means for modulating a second control signal on the carrier following said audio signal;

a receiver having a demodulator and squelch means coupled thereto by delay means;

means responsive to said first control signal to actuate said squelch means to permit reproduction of received signals;

and means responsive to said second control signal to actuate said squelch means to prevent reproduction of received signals.

3. A receiver for a communication system wherein a transmitted carrier is modulated by an audio signal, comprising:

a demodulator for extracting said audio signal from said carrier;

switch means for enabling or disabling reproduction of received signals;

a flip flop having an output terminal connected to said switch means for controlling the operation of said switch means;

delay means coupling said switch means to said demodulator after a predetermined time period;

and a detector coupled to said demodulator and having first and second output terminals, said first output terminal being coupled to said flip flop for controlling the enabling of reproduction of received signals, said second output terminal being coupled to said flip flop for controlling the disabling of reproduction of received signals, whereby said switch means enables reproduction of signals a predetermined time period before said audio signal reaches said switch means and disables the reproduction of signals after the termination of said audio signal.

4. A receiver for a communication system wherein a transmitted carrier is modulated by an audio signal, comprising:

a demodulator for extracting said audio signal from said carrier;

switch means for enabling or disabling reproduction of received signals;

a flip flop having an output terminal connected to said switch means for controlling the operation of said switch means;

first delay means coupling said switch means to said demodulator after a first predetermined time period;

a detector coupled to said demodulator and having first and second output terminals, said first output terminal being coupled to said flip flop for controlling the enabling of reproduction of signals;

and second delay means producing a time delay for a second predetermined time period coupling said second output terminal of said detector to said flip flop for controlling the disabling of reproduction of signals, whereby said switch means enables reproduction of signals a predetermined period before said audio signal reaches said switch means and disables reproduction of signals a predetermined time after said audio signal passes through said switch means.

References Cited

UNITED STATES PATENTS

| | | | |
|---|---|---|---|
| 1,691,076 | 11/1928 | Mathes | 325—22 |
| 2,206,080 | 7/1940 | Davis | 179—170.8 X |
| 2,232,080 | 2/1941 | Seidelbach | 325—144 X |
| 2,248,746 | 7/1941 | Davis | 325—64 X |
| 3,198,888 | 8/1965 | Lemelson | 325—55 X |

ROBERT L. GRIFFIN, *Primary Examiner.*

B. V. SAFOUREK, *Assistant Examiner.*